United States Patent [19]

Kinoshita et al.

[11] Patent Number: 4,496,517
[45] Date of Patent: Jan. 29, 1985

[54] PROCESS FOR PREPARING SATURATED POLYESTER RESIN BOTTLES

[75] Inventors: Harumi Kinoshita; Hideo Kushida; Takeshi Itakura; Masao Akutsu; Takuzo Takada; Hiroaki Sugiura, all of Tokyo, Japan

[73] Assignee: Yoshino Kogyosho Co. Ltd., Japan

[21] Appl. No.: 370,891

[22] Filed: Apr. 22, 1982

Related U.S. Application Data

[63] Continuation of Ser. No. 128,351, filed as PCT 78/00036, Dec. 2, 1978, § 102(e) Jul. 30, 1979, abandoned.

[30] Foreign Application Priority Data

Dec. 2, 1977 [JP] Japan .................... 52-144738
Dec. 29, 1977 [JP] Japan .................... 52-159073
Jan. 11, 1978 [JP] Japan .................... 53-1804
Jan. 12, 1978 [JP] Japan .................... 53-2296

[51] Int. Cl.$^3$ ............................................. B29C 17/07
[52] U.S. Cl. .................................. 264/521; 264/532; 264/534
[58] Field of Search ............... 264/521, 531, 532, 534, 264/523, 535, 537–543; 425/526

[56] References Cited

U.S. PATENT DOCUMENTS

| 4,035,455 | 7/1977 | Rosenkranz et al. | 264/521 X |
| 4,039,641 | 8/1977 | Collins | 264/532 X |
| 4,108,937 | 8/1978 | Martineu et al. | 264/532 X |
| 4,151,250 | 4/1979 | Barry et al. | 264/532 |
| 4,233,022 | 11/1980 | Brady et al. | 264/521 X |

FOREIGN PATENT DOCUMENTS 2540930  4/1976  Fed. Rep. of Germany ...... 264/538

Primary Examiner—Jan Silbaugh
Attorney, Agent, or Firm—Parkhurst & Oliff

[57] ABSTRACT

This invention relates to process for preparing saturated polyester resin bottles, that the residual strain of the bottles is reduced and the deforming temperature is elevated. The process is that a heated intermediate material (1) made of a saturated polyester resin is set in a mold (5), then compressed air is blown in the intermediate material (1) to orient the same biaxially, temperature in thus shaped bottle is elevated to a temperature higher than the heating temperature of the intermediate material (1) under the elevated pressure to effect thermal fixing and thereafter the saturated polyester resin bottle (19) is taken out.

5 Claims, 10 Drawing Figures

PROCESS FOR PREPARING SATURATED POLYESTER RESIN BOTTLES

This is a continuation, of application Ser. No. 128,351, filed as PCT 78/00036, Dec. 2, 1978, § 102(e) dated July 30, 1979, and now abandoned.

TECHNICAL FIELD

The present invention relates to a process for preparing thermally fixed, saturated polyester resin bottles.

BACKGROUND OF THE PRIOR ART

Saturated polyester resin bottles have attracted attention, because they have the advantages that they are free from exudation of harmful materials such as a solvent from the bottles and also free from generation of harmful gases when they are burnt after the use. The bottles are molded generally by biaxial orientation so as to increase the mechanical strength of the material. However, the saturated polyester resin bottles thus prepared by biaxial orientation are apt to have residual strains on the inner walls thereof. Accordingly, if a high temperature liquid is charged in the bottles for the purpose of, for example, sterilization, a heat deformation is caused due to the strains to reduce the volume of bottles significantly. Further, when the high temperature liquid charged in the bottles is cooled, pressure in the bottles is reduced tending to also deform the same. For preventing the deformation, reinforcing ribs may be provided on the walls of the bottles, or bottles of an irregular shape which are hard to deform are employed. However, if the saturated polyester resin bottles are formed in such an irregular shape by biaxial orientation, the strains are increased even further and the heat deformation becomes worsened.

BRIEF SUMMARY OF THE INVENTION

The first object of the present invention is to prevent heat deformation of bottles made of saturated polyester resin upon high temperature sterilization, by thermal fixing of the bottles. A second object of the present invention is to effect the thermal fixing of the bottles rapidly by combining the step of thermally fixing of the bottles with the step of biaxial orientation of the intermediate material. A third object of the invention is to reduce heating time for the thermal fixing of the bottles, thereby preventing the saturated polyester resin bottles from being crystallized and thereby from becoming milky white in color. A fourth object of the invention is to prevent reduction in volume of the bottle due to heat deformation of the bottle bottom by forming inside projections on the bottom of the bottle in the biaxial orientation step. A fifth object of the invention is to fix the shape of the bottle by cooling the bottle after the treatment of thermal fixing.

DETAILED DESCRIPTION OF THE INVENTION

Figure 1:
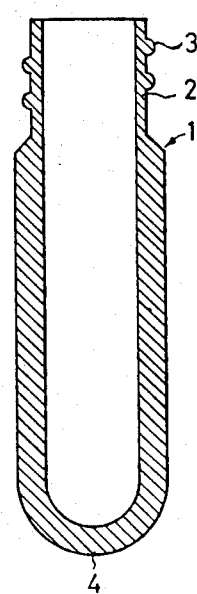
FIG. 1 is a cross sectional view of an intermediate material used in the process of the present invention.
Figure 2:
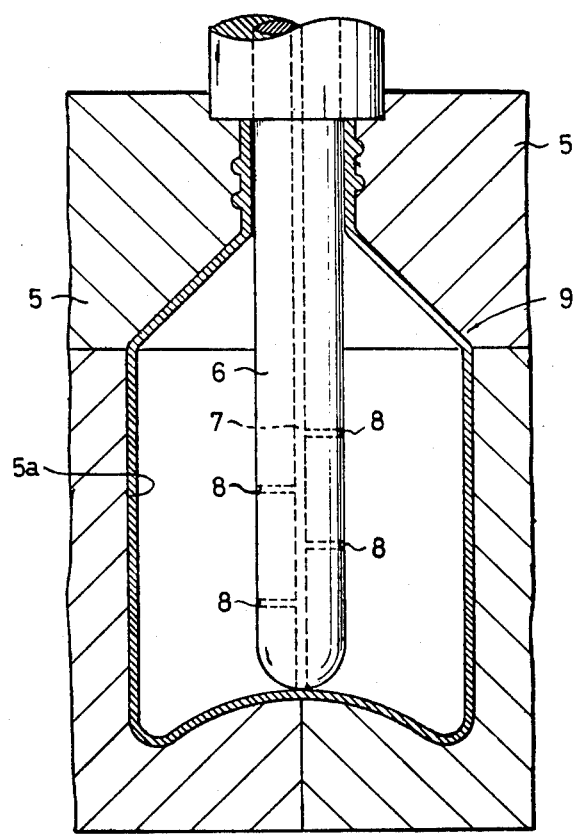
FIG. 2 is a cross sectional view showing the intermediate material placed in a mold to form a bottle.

A process for preparing a saturated polyester resin bottle of the present invention according to a first Example will be described with reference to FIGS. 1 and 2. First, a saturated polyester resin intermediate material 1 is formed by, for example, injection molding. The intermediate material 1 is in a tubular shape having an opening at the top. A neck portion 2 at the top is shaped preferably in the same shape as that of the final product. Around the neck portion 2, threads 3 are formed for meshing with a cap. The lower part of the intermediate material 1 is closed to form a bottom 4. After the injection molding, the intermediate material 1 is cooled rapidly so as to prevent crystallization of the saturated polyester resin and avoid a milky white color of the intermediate material 1.

Then, the intermediate material 1 is heated to a temperature suitable for biaxial orientation (about 75°–100° C.), and it is set in a blow molding mold 5. Mold 5 is a mold which can be heated to a temperature (for example, 130° C.) higher than the temperature of the intermediate material 1 (for example, 95° C.) and which can be cooled to a cooling temperature (for example, 100° C.) after thermal fixing. As for heating and cooling means for the mold 5, the whole mold 5 may be heated or cooled externally, or alternatively a more suitable means, as will be shown in Example 2, may be employed.

The mold 5, in which the internal material 1 has been set, is heated previously to a high temperature (about 130° C.). Then, an extruding rod 6 is inserted downward in the intermediate material 1 through the neck portion 2. In the rod 6, an air passage 7 is provided along an axis of the rod for passing compressed air therethrough. An optional number of air outlets 8 connected with the air passage 7 are provided in the lower part and sides of the rod 6. Through the air outlets 8 of the rod 6, compressed air is blown into the intermediate material 1 to expand the same. At the same time, the bottom 4 is protruded downward with the rod 6 to effect the biaxial orientation of the intermediate material 1.

Upon the expansion of the intermediate material to the final state of a bottle 9, the shaping of the bottle is completed in contact with inner walls 5a of the mold. Since the inner walls 5a of the mold are heated to a temperature higher than that of the intermediate material 1, the bottle is thermally fixed by contacting the same with the walls 5a. The strain caused by the biaxial orientation disappears by the thermal fixing. In this case, the bottle is not deformed, since it is filled with high pressure air.

Thermal fixing treatment time is about 30 seconds when mold temperature is 130° C. to prevent crystallization of the saturated polyester used as material of the bottle, thereby preventing discoloration of the bottle. This means is employed because mechanical strength of the bottle is reduced by the crystallization. However, only the bottle surface may (desirably) be crystallized in order that overall mechanical strength of the bottle is not affected and yet the process produces a frosted bottle. In such a case, thermal fixing time may be prolonged.

After the thermal fixing, the temperature of the mold 5 is lowered to about 100° C. and the shaped bottle 9 is taken out. The reason why temperature of the mold is lowered is that the trunk wall of the bottle is hardened by lowering temperature of the bottle so as to prevent deformation of the bottle by an external force when the bottle is taken out.

For the temperature lowering, a method wherein cooling air is introduced in the bottle through the air outlets 8 may be employed in addition to a process wherein the mold is cooled externally.

According to the above-described process, internal strain of the bottle due to the biaxial orientation is thermally fixed and, thereafter, heat deformation will not be caused even if the bottle is heated. Treatment temperature in the thermal fixing is set above a temperature at which the bottle will be heated in actual use. As the bottle is shaped by biaxial orientation, the bottle is thermally fixed by the heated mold. Thus, unlike conventional processes, the bottle formation and thermal fixing can be effected at once and the bottle formation can be completed rapidly. Further, as an added benefit, the reduction in heating time for the thermal fixing assures the prevention of discoloration of the bottle.

Though the thermal fixing is effected by heating the mold 5 to about 130° C. in the above example, another method may be employed wherein the mold is heated to 100° C. and compresses air at, for example, 200° C. is blown into the bottle. After the thermal fixing, cooling air is blown in the bottle.

Though the high temperature compressed air is required to be blown only in the thermal fixing treatment, this air may be used in the biaxial orientation step as well as for the thermal fixing, if no harm is done during the biaxial orientation.

Using the latter procedure, the temperature of the mold is set at about 100° C. and, therefore, it is unnecessary to change temperatures of the mold in the thermal fixing step and before the taking-out of the bottle. Accordingly, a large-scale device for temperature control is unnecessary and the thermal fixing treatment can be completed rapidly.

Figure 4:
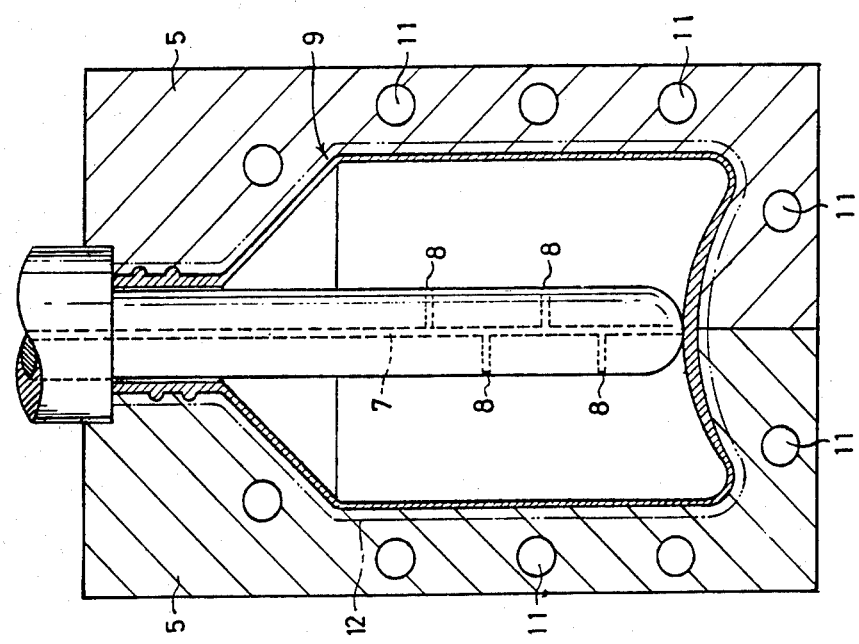
FIG. 4 is a cross sectional view showing biaxial orientation of the intermediate material in the mold.
Figure 3:
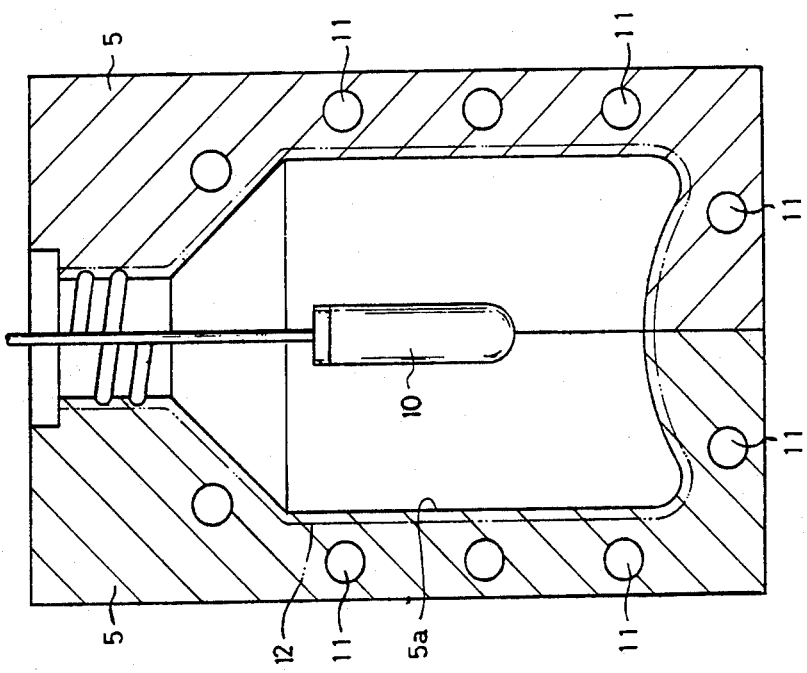
FIG. 3 is a cross sectional view showing heating conditions in the mold of a second example.
Figure 5:
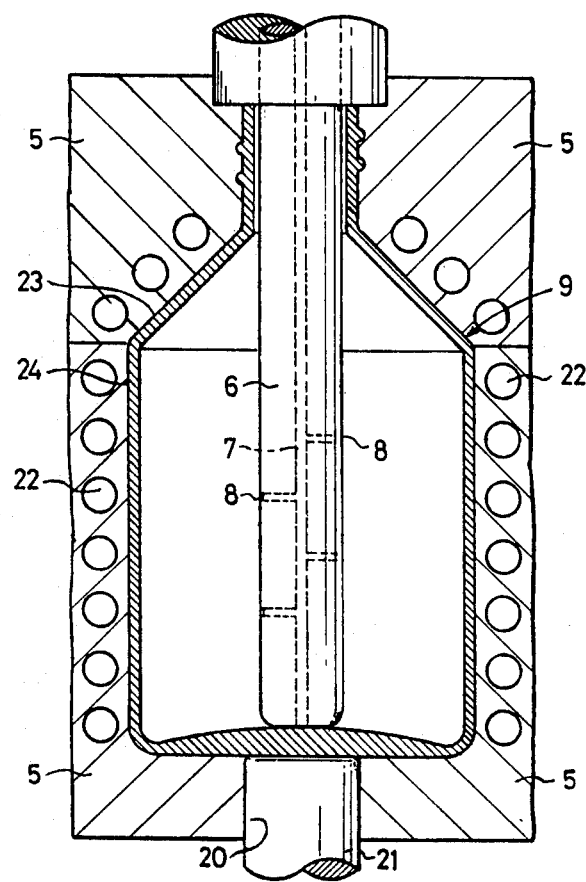
FIG. 5 is a cross sectional view showing the formation of a bottle of a third example.

Example 2 of the present invention will be described with reference to FIGS. 3 and 4. In this example, heating in the mold for thermal fixing is effected with an infrared lamp 10 and openings 11 for passing cooling water are provided in the mold 5 for preventing excessive heating of the mold or for cooling the mold. The inner surface of the mold 5 may be lined with a metal 12 such as aluminum or stainless steel different from a material of the mold. In such a case, only the inner surface of the mold 5 is readily heated due to the difference in thermal conductivity at the inner surface 5a. Other steps in the preparation of the bottles are the same as in Example 1.

In the above Example 2, only the inner surface of the mold is heated rapidly and, consequently, calories required for the heating can be saved to increase preparation efficiency. After repetition of the molding of bottle many times, the temperature of the mold generally becomes excessively high. However, in such a case, the mold can be kept at a suitable temperature with the water passing through the openings 11, and no trouble is caused when the bottle is taken out from the mold.

Example 3 of the present invention will be described with reference to FIGS. 5 through 7A and 7B. In this example, special consideration is given to the thermal fixing of the bottom of the bottle. More particularly, the biaxial orientation is apt to be insufficient on the bottom wall of the bottle and, consequently, the bottom wall becomes thick. As a result, a longer heating time is required for the thermal fixing as compared with the trunk thereof which is of a smaller thickness. However, after a long heating time, the heated surface of the trunk or the bottom can become discolored due to crystallization. A saturated polyester resin is crystallized and the milky white discoloration phenomena occurs therein if it is heated at a temperature higher than its glass transition temperature (about 70° C.) and lower than its crystallization temperature (about 130° C.) due to a specific relationship between the temperature and heating time. Therefore, the duration of the thermal fixing treatment should be particularly reduced to prevent discoloration of the bottle and also to prevent the reduction in mechanical strength of the bottle.

In such a case, the mold 5 is so designed that a through hole 20 is provided at the bottom of the mold 5 through which an ascending protruding rod 21 is provided. Numerous passages 22 are provided in the mold 5 through which a heating heat transfer fluid is passed when it is to be heated and a cooling heat transfer fluid is passed when it is to be cooled.

Figure 6A:
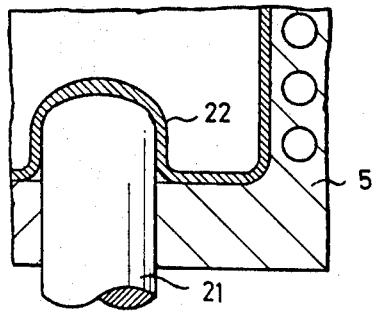
FIGS. 6A and 6B are cross sectional views showing protrusion of the bottom of a bottle in a mold of the third example.
Figure 6B:
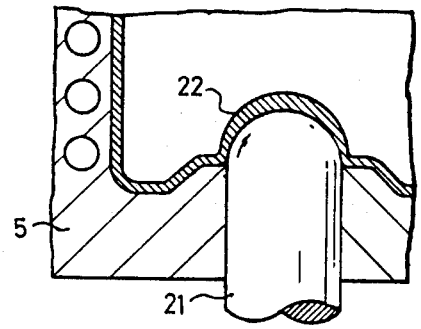
Figure 7A:
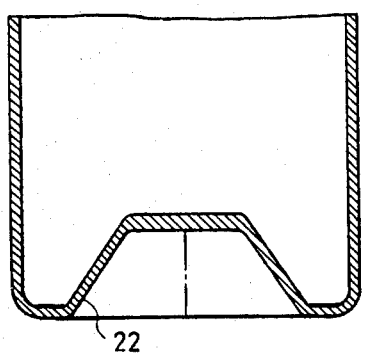
FIGS. 7A and 7B are a side view and a bottom view showing an alternate form of deformation of the bottom of a bottle.
Figure 7B:
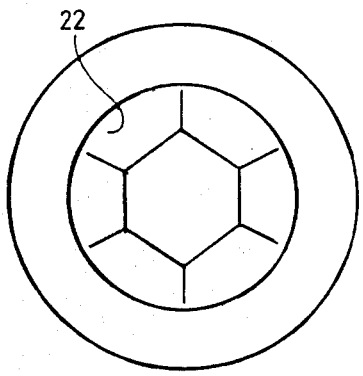

Thus, in the biaxial orientation of the intermediate material 1 set in the mold 5, the rod 6 is inserted in the intermediate material 1 to push down the bottom of the intermediate material 1 while compressed air is blown therein through the air outlets 8. Upon the sufficient orientation, the rod 6 is drawn up, for example, halfway. Then, the rod 21 is pushed up to extrude the center of the bottom of the bottle inward to form a tapering rising wall 22. As a result, the protruded top wall is slightly thicker than the trunk walls of the bottle but the rising wall 22 thus oriented is as thin as the trunk wall. Even though the bottom wall is thus protruded, the shape of the bottle is kept along the inner walls of the mold, since the bottle is filled with the compressed air. Two different manners of protrusion with the rod 20 are shown in FIGS. 6A and 6B. In FIGS. 7A and 7B, the bottom shape of a bottle protruded with a hexagonal rod is shown.

Upon completion of the biaxial orientation, shoulders 23 (FIG. 5) and a trunk portion 24 are thermally fixed by contacting them with the inner walls of the heated mold 5. The thermal fixing of the bottom of the bottle may be effected separately, since it cannot be effected at the same time. The thermal fixing of the bottom is sometimes omitted, since the complete thermal fixing of the top of the rising wall at the bottom is difficult. This omission causes no problem, since even if the bottom of the bottle is subjected to heat deformation, only the height of the rising wall 22 is reduced, but the volume of the bottle is not reduced.

In this example, it is possible to thermally fix the whole bottle by blowing compressed high temperature air in the bottle instead of the thermal fixing by heating of the mold. By this means, the bottom of the bottle is also thermally fixed with certainty.

Figure 8:
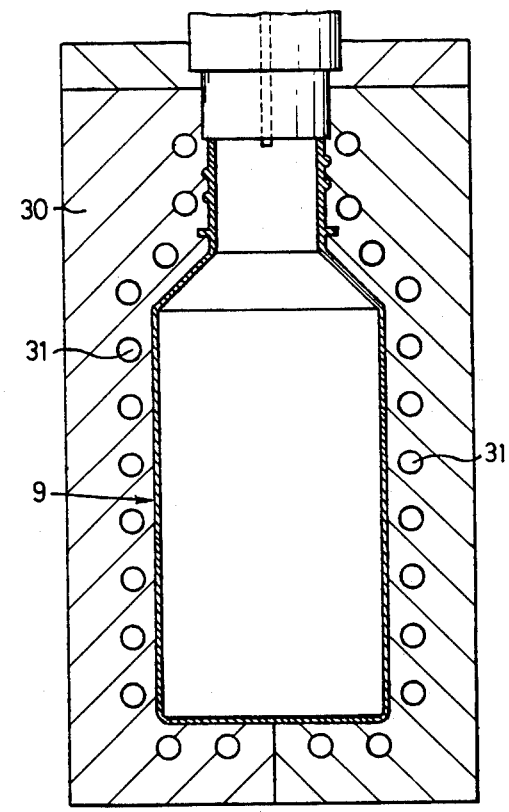
FIG. 8 is a cross sectional view showing a method of reducing residual strain of a bottle.

Example 4 of the present invention will be described with reference to FIG. 8. In this example, a residual strain in the bottle shaped by the biaxial orientation is thermally fixed so that even if the bottle is heated, no heat deformation is caused. In this method, a bottle made of a saturated polyester resin is set in a mold 30 and a compressed gas of about 5 Kg/cm² is charged in the bottle for preventing shrinkage. The mold 30 is heated by passing a vapor or heated silicone oil or polyethylene glycol through passages 31. After a given period of time, a cooling heat transfer medium is passed through the passages 31 to cool the mold 30. Then, the thermally fixed bottle is taken out from the mold. The mold may be heated by high frequency induction.

Alternatively, a mold made of a material of low thermal conductivity such as asbestos may be used in place of said metal mold. A bottle is set in the mold, compressed high temperature gas is blown therein to heat the bottle, thereby reducing a residual strain, and then the bottle is taken out and cooled.

In another method, the bottle supported in a suitable support member is charged with a compressed gas without using said mold or metal mold, then the bottle is heated directly externally with hot air, vapor or the like to reduce or remove a residual strain, and the bottle is cooled.

Thus, the thermal shrinkage due to residual strain can be prevented. Accordingly, even if internal strains are caused in bottles made of a saturated polyester resin by the biaxial orientation, the strains can be fixed completely.

We claim:

1. A process for preparing a saturated polyester resin bottle from a tubular intermediate piece made of saturated polyester resin having a bottom wall and a top opening, comprising the sequential steps of:
    heating the intermediate piece to a temperature suitable for biaxial orientation and setting the same in a heated mold for blow molding;
    blowing compressed gas into the intermediate piece while inserting a rod downwardly into the interior of the intermediate piece to conform the intermediate piece to the inner walls of the mold and effect biaxial orientation;
    heat fixing the sidewalls of the bottle at a temperature higher than said temperature suitable for biaxial orientation to which said intermediate piece has been heated while maintaining gas pressure in the bottle to effect thermal fixing of said sidewalls heated to said higher temperature after the formation of the bottle by said biaxial orientation, the duration of the last-mentioned heating step being sufficiently short that crystallization of the polyester resin and milky white discoloration thereof do not occur; and
    lowering the temperature of the bottle and removing the bottle from the mold;
    wherein, during biaxial orientation of the intermediate piece and while the bottle is kept along the inner walls of the mold, the center of the bottom wall of the bottle is protruded inwardly so that the thickness and degree of orientation of a lower half of the resulting tapering rising wall of the protrusion are substantially the same as those of the trunk portion of the bottle, thereby making it possible to prevent heat deformation of the bottom wall; and wherein the bottom of the bottle is also thermally fixed without crystallization and milky white discoloration.

2. A process for preparing a saturated polyester resin bottle according to claim 1, wherein said step of thermal fixing of said side walls is carried out by heating the mold to a temperature higher than the heating temperature of the intermediate piece.

3. A process for preparing a saturated polyester resin bottle according to claim 1, wherein said step of thermal fixing of said side walls is effected by blowing compressed high temperature air into the bottle.

4. A process for preparing a saturated polyester resin bottle according to claim 1, wherein compressed high temperature air is used as the compressed gas in said blowing step, and said step of thermal fixing of said side walls is effected by blowing said compressed high temperature air into the bottle with the mold heated to about 100° C.

5. A process for preparing a saturated polyester resin bottle according to claim 1, wherein the bottom of the bottle is separately thermally fixed without crystallization after the bottle has been taken out of the mold.

* * * * *